Patented Sept. 22, 1936

2,054,989

UNITED STATES PATENT OFFICE 2,054,989

COMPOSITIONS FOR APPLICATION TO THE HUMAN SKIN

William C. Moore, Stamford, Conn., assignor to U. S. Industrial Alcohol Co., New York, N. Y., a corporation of West Virginia No Drawing. Application December 30, 1933, Serial No. 704,751

6 Claims. (Cl. 167—58)

My invention relates to a new kind of predominantly alcoholic composition for application to the human skin.

An object of the invention is to provide a semi-solid mass which comprises principally alcohol and which is well adapted for massage and rubbing purposes. Another object is to provide a kind of alcoholic composition which is an advantageous base adapted to carry various medicaments and other beneficial additions, up to considerable quantities.

Liquid rubbing alcohols are essentially more or less dilute alcohol, denatured in compliance with law, and there is frequently an undue amount of diluent (water) in the preparations sold to the public. The compositions of this invention, except when used as carriers for medicaments, are necessarily high in alcohol, above 75%, and usually above 80% alcohol by weight. The use of liquid rubbing alcohols is attended by much loss and inconvenience through spilling and evaporation and because a thin liquid must be taken upon the hand and then applied to the portion of the body to be rubbed.

The desirability of a satisfactory rubbing alcohol in non-liquid form is apparent, but the attainment of the object involved extensive experimentation. After successful results were eventually obtained with mixtures of ethyl and isopropyl alcohols it seemed doubtful that good straight ethyl alcohol preparations, more desirable for commercial reasons, could be obtained, but that has now been accomplished and examples of ethyl alcohol and mixed ethyl and isopropyl alcohol compositions will be given. The kind of alcoholic rubbing composition that was sought was one that would be better for transportation and use than a liquid, and that could be easily removed as a mass, in small quantities, from a jar, that would retain its semi-solid consistency in the container after keeping and also upon disturbance of the contents, that would adhere to the fingers until properly placed on the body, that would spread as does a thin liquid over the body on gentle rubbing, and that would leave the skin feeling cool and refreshed without a residue of objectionable amount or character remaining after the alcohol had disappeared by absorption and by evaporation.

It has long been known that "alcogels" can be made which contain 4 or 5% of the gel-former by weight. Such salts as calcium acetate, and various soaps, as sodium stearate, were successfully used to "solidify" alcohol many years ago. More recently various other compounds have been proposed for such purposes, notably the sodium salt of B fructose diacetone sulfonic acid.

Primary alcogels of the type just described, except as appropriately modified and preferably modified in accordance with the herein disclosed invention, have many properties which render them unsuited for use as a semi-solid rubbing alcohol. Thus, alcogels having soap or other gel-former concentration of as high as 4-5% by weight are a jelly-like semi-solid with definite elastic or rubber-like characteristics; and if the soap concentration is low (around 2%), they have little mechanical strength and are highly syneretic, in that on standing at room temperature the gel shrinks away from its container walls, the contraction resulting in the solid component separating as a clot in a body of liquid.

This syneresis can be controlled somewhat, by adjusting the hydrogen ion concentration to a definite optimum value which will depend in turn on the nature of the alcohol used, its concentration, and the concentration and kind of the gelling agent. In general, it can also be controlled somewhat by increasing the concentration of the soap or other gel-former used, but an alcogel of soap in ethyl alcohol, if firm mechanically, would contain so much soap that if it were possible to spread it on the skin it would leave the latter feeling soapy and disagreeable.

Furthermore, it would be impossible satisfactorily to rub ordinary soap and similar alcogels on a body surface as a thin layer which would liquefy on gentle rubbing. Instead, under such treatment, the elastic gel tends to break up into granules or lumps which roll about and drop off the body. It is impractical, also, to remove convenient portions of such a gel from a container. If a simple gel, as, for instance, one of sodium stearate, is rubbed on the skin, there will be a few solid particles and much liquid, difficult to manage, if the gel has a low concentration of gelling agent; while a gel of higher "gel former" concentration (4% by weight) will break up on handling or rubbing into many hard lumps which liquefy with difficulty, partly because the softening point (around 65–70° C.) is so far above the normal temperature (37° C.) of the human body, and partly because the tendency to break into lumps or granules is so pronounced that spreading it in a thin layer is out of the question.

The objects sought in this invention have, in brief, been accomplished by incorporating in a mixture of an alcoholic menstruum and a little of a gel-forming agent a small but sufficient amount of a solid true wax; a mixture of various of these waxes; a wax or mixture of such waxes with paraffin; or a solid wax or mixture of such waxes with or without paraffin, with anhydrous lanolin and/or a glyceride fat, or with combinations of such additions.

The compositions embraced within the invention are distinguished from simple alcogels by being in the nature of non-elastic, non-syneretic or little syneretic, opaque, masses of even texture, which can be spread as a thin layer on the skin and which liquefy under gentle rubbing at body temperature. While I am not prepared to give a scientific description of the structure of these compositions, their consistency is such that they may be termed emulsified or suspensoid gels. The gel would seem to exist as minute particles protected by the wax.

Various natural true waxes, such as beeswax, carnauba wax, candelilla wax, spermaceti, and Chinese insect wax, and certain synthetic waxes, as "Rilan" wax, for example, may be used for the purpose of the invention. Naturally each wax has some distinguishing characteristics, and an appropriate selection of the wax or combinations of waxes may be made for different specific formulae.

Paraffin or an equivalent mineral oil exerts an anti-syneretic influence, which may be made use of in reduction of the amount of gel-former or wax or both.

Lanolin and cocoanut oil have two functions when they are included in the compositions, namely: they bring the melting point, or more properly the softening point of the composition nearer the body temperature, and they have a cosmetic value in that they tend to keep the skin soft and pliable. Other glyceride fats, as for instance palm oil, olive oil, tallow, etc., can be used instead of cocoanut oil. Glycerine, linseed oil or China-wood oil may be used, as also other ingredients.

The following examples are illustrative of the invention:

*Example 1.*—1.81 parts of high grade stearic acid and 2.42 parts of best quality white beeswax are dissolved in 85.58 parts of boiling absolute ethyl alcohol. The acid is neutralized by adding to the alcoholic mixture, sodium hydroxide dissolved in water, until the reaction is decidedly alkaline. For this purpose 3.73 parts of a solution made by dissolving 10 parts of the base in 100 parts of distilled water is used, giving a pH value of 9.4 in the hot mixture by the indicator thymol blue. Finally, there is added to the hot solution 6.46 parts of water, after which the solution is allowed to cool and set up. In a short while it sets to a fine-grained, non-elastic, substantially non-syneretic mass of even texture, which can be spread thinly on the skin and which liquefies readily with rubbing. The parts referred to throughout the specification are parts by weight. This product contains substantially 2.0% sodium stearate, 2.40% beeswax, 10.0% water and 85.6% alcohol.

The amounts of gel-former, or soap, and of wax in such a composition can be reduced, and also the sensation on the skin after rubbing can be improved, by employing a combination of two or more waxes and by including certain other constituents. The following is illustrative of a preferred ethyl alcohol composition.

*Example 2.*—1.51 parts of stearic acid, 0.86 parts of spermaceti, 0.86 parts of candelilla or carnauba wax, 0.43 parts of white beeswax, 0.43 parts of paraffin, 0.43 parts of cocoanut oil, and 0.13 parts of anhydrous lanolin are dissolved in 92.26 parts of boiling absolute ethyl alcohol, 3.09 parts of a sodium hydroxide solution of the same strength as in Example 1 are added. When the solution becomes cool, a fine-grained, smooth, inelastic, non-syneretic mass, having excellent properties as an alcoholic massage and skin-refreshing preparation, is obtained.

*Example 3.*—1.44 parts of stearic acid and 3.30 parts of spermaceti are dissolved in a boiling mixture consisting of 35.34 parts of isopropyl alcohol (98% alcohol by weight) and 54.16 parts of ethyl alcohol (96% alcohol by weight). 2.96 parts of the sodium hydroxide solution are added. To the boiling mixture 2.80 parts of water are added, and the mixture is then allowed to cool, and sets to a mass having the desired characteristics and qualities.

*Example 4.*—1.46 parts of stearic acid, 0.84 parts candelilla wax, 0.42 parts of white beeswax, and 0.42 parts of spermaceti are dissolved in a boiling mixture consisting of 35.90 parts of 98% isopropyl alcohol and 55.06 parts of 96% ethyl alcohol. 3.05 parts of the sodium hydroxide solution are added. Finally 2.85 parts of water are added and the mixture is set aside to cool and set.

*Example 5.*—1.46 parts of stearic acid, 0.84 parts of carnauba wax, 0.84 parts of white paraffin, 0.42 parts of cocoanut oil and 0.12 parts of lanolin are dissolved in 36.14 parts of isopropyl alcohol (98%) at the boiling point, and 55.08 parts of ethyl alcohol (96%) are then added, after which the acid is neutralized by the addition of 2.64 parts of the sodium hydroxide solution. 2.46 parts of water are added to the hot mixture, which is then allowed to cool and set.

*Example 6.*—0.85 parts of spermaceti, 0.85 parts of candelilla wax, 0.43 parts of white beeswax, 0.43 parts of paraffin, 0.43 parts of cocoanut oil, 0.13 parts of lanolin and 1.48 parts of stearic acid are dissolved by heating to boiling, in 92.36 parts by weight of ethyl alcohol, denatured with acetone according to U. S. formula 23A. There are then added 3.04 parts of sodium hydroxide (10%) solution in water; after which the mixture is set aside to cool. The 92.36 parts of denatured alcohol contained substantially 8.31 parts of acetone and 84.05 parts of absolute ethyl alcohol.

It will be observed that the alcoholic content of these rubbing compositions is high and that the total of the non-alcoholic ingredients, other than water and denaturants required by law, may be of an order of less than 6%. The amount of soap, such as sodium stearate, which I prefer to use as the gel-former in these compositions, is small and need not exceed 3%, and is usually considerably less. The compositions do not admit of much water dilution of the alcohol, since if the water content were increased much above 12%, so much solids would be required that the effect of the residue left on the skin would make the products unacceptable for rubbing alcohol purposes. A small enough residue on the skin is quite unobjectionable, but any considerable amount is unpleasant and undesirable.

For the production of satisfactory compositions, it is important to employ proper proportions of the gel-former, such as soap, and of the gel modifier, which is a solid true wax, or a combination of waxes, or a combination of such wax or waxes with ingredients such as paraffin, lanolin and oil, but the variables in the number and specific nature of ingredients are such that relative limits of general applicability can scarcely be stated. These matters are also affected by the particular hydrogen ion concentration which is brought about.

When soap as a gel-former is formed in the preparation of the compositions, the alkali, such as sodium hydroxide, may be added dissolved, not in water, but in part of the alcohol. Water may or may not be added. If used, it is one of the factors controlling softness of the compositions.

If mixtures of ethyl alcohol and a propyl alcohol are used, their relative proportions, one to the other, may be varied as desired. I have also made usable compositions with isopropyl alcohol as the only alcohol in the products and others with normal propyl alcohol alone. Mixtures of the two propyl alcohols may also be used.

Various soaps and the like may be used as gel-formers, as may also other agents for gelling alcohol. Cellulose esters, such as cellulose nitrate, are not suitable for the purposes of this invention. If oleic acid is used in place of stearic acid softer gels result. Soap, if the gel-former, need not be formed in the compounding of the product, but may be added as such.

One of the properties that has been sought in the development of the herein described compositions is ability of the mass, low in solids, to keep its alcoholic liquid occluded not only during quiet storage but also when it is disturbed, as it is when a portion of the contents is scooped out with the fingers. Though release of a slight amount of liquid in the jar under such treatment is not impermissible, any copious "weeping" would defeat the purpose of the invention. I have found that alcoholic compositions that are low in solids and also liquid retentive can be produced.

The lowered melting or softening point of the compositions is of value in a preparation which is to be applied to the body.

The compositions are modified alcogels which are not only thixotropic, that is to say capable of setting up again after being liquefied by violent agitation or beating, but after such treatment regain the smooth, semi-solid structure which they originally possessed, without any great increase in syneresis.

This property is of advantage when products such as have been described are used as base materials in which, subsequently, medicating agents, etc. are incorporated. As illustrations, it may be stated that zinc stearate, zinc oxid and sulfur have been successfully incorporated by grinding them with the semi-solid mass, and allowing it to set again. In the case of sulfur, for example, this is important, because sulfur reacts with alcoholic compositions of this type, when it is heated, even in small amounts, with them at temperatures above 45° C., yet large quantities of sulfur may be incorporated in one of these base mixtures, by grinding, giving fine grained, smooth preparations which are admirably suited for applying an adherent film of sulfur to a body surface for healing purposes. Similar adherent films of zinc stearate or zinc oxid are likewise easily applied.

In other cases, remedial, cosmetic or skin-protective agents, for example such as oil of wintergreen, oil of citronella, camphor, phenol and zinc phenate, may be incorporated directly in the alcoholic composition when it is originally compounded. The compositions may also be colored or perfumed as desired.

It will be understood that for commercial purposes the ethyl alcohol used in the compositions embraced within the invention may be denatured in accordance with the formulae prescribed by governmental regulations and applicable to rubbing alcohols. Denatured alcohol containing acetone is suitable.

It is believed that the invention and its susceptibility of modification will be readily comprehended from the foregoing detailed description and the illustrative examples.

I claim:

1. A composition predominantly alcoholic for application to the skin, comprising an alcoholic menstruum, the alcohol of which contains not less than two and not more than three carbon atoms, an alcohol gel-forming agent in amount of not more than substantially 3% by weight, and a small amount of a normally solid wax, said agent and wax and their amounts being such that the composition is a substantially non-elastic and non-syneretic, opaque, semi-solid mass of smooth, even texture, which can be spread evenly on the skin and is readily liquefiable under gentle rubbing at body temperature.

2. A composition predominantly alcoholic for application to the skin, comprising an alcoholic menstruum, the alcohol of which is a mixture of ethyl and propyl alcohols, an alcohol gel-forming agent in amount of not more than substantially 3% by weight, and a small amount of a normally solid wax, said agent and wax and their amounts being such that the composition is a substantially non-elastic and non-syneretic, opaque, semi-solid mass of smooth, even texture, which can be spread evenly on the skin and is readily liquefiable under gentle rubbing at body temperature.

3. A composition predominantly alcoholic for application to the skin, comprising an alcoholic menstruum, the alcohol of which contains not less than two and not more than three carbon atoms, soap as a gel-forming agent in amount of not more than substantially 3% by weight, and a small amount of a normally solid wax, said agent and wax and their amounts being such that the composition is a substantially non-elastic and non-syneretic, opaque, semi-solid mass of smooth, even texture, which can be spread evenly on the skin and is readily liquefiable under gentle rubbing at body temperature.

4. A composition predominantly alcoholic for application to the skin, comprising an alcoholic menstruum, the alcohol of which contains not less than two and not more than three carbon atoms, an alcohol gel-forming agent in amount of not more than substantially 3% by weight, and small amounts of a normally solid wax and paraffin, said agent and wax and their amounts being such that the composition is a substantially non-elastic and non-syneretic, opaque, semi-solid mass of smooth, even texture, which can be spread evenly on the skin and is readily liquefiable under gentle rubbing at body temperature.

5. A composition predominantly alcoholic for application to the skin, comprising an alcoholic menstruum, the alcohol of which contains not less than two and not more than three carbon atoms, an alcohol gel-forming agent in amount of not more than substantially 3% by weight, and small amounts of a normally solid wax and of glyceride fat, said agent and wax and their amounts being such that the composition is a substantially non-elastic and non-syneretic, opaque, semi-solid mass of smooth, even texture, which can be spread evenly on the skin and is readily liquefiable under gentle rubbing at body temperature.

6. An alcoholic composition for application to the skin comprising a mixture of ethyl and propyl alcohols, the total amount of the alcohol mixture present being in excess of 75% by weight, sodium stearate as a gel-forming agent in amount less than 3% by weight, and small amounts of paraffin, lanolin, cocoanut oil, and of normally solid wax, said agent and wax and their amounts being such that the composition is a substantially non-elastic and non-syneretic, opaque, semi-solid mass of smooth, even texture, which can be spread evenly on the skin and is readily liquefiable under gentle rubbing at body temperature.

WILLIAM C. MOORE.